United States Patent [19]

Oertle

[11] 4,104,906

[45] Aug. 8, 1978

[54] EARLY CRACK DETECTION WITH MULTI-PRESSURE SYSTEM

[75] Inventor: Donald H. Oertle, Ponca City, Okla.

[73] Assignee: Continental Oil Company, Ponca City, Okla.

[21] Appl. No.: 784,193

[22] Filed: Apr. 4, 1977

[51] Int. Cl.² .............................................. G01M 3/02
[52] U.S. Cl. ......................................... 73/104; 73/40; 116/70
[58] Field of Search ................... 73/37, 40, 40.7, 49.2, 73/49.3, 104; 116/70, 114 AC, 114 PV

[56] References Cited

U.S. PATENT DOCUMENTS

| | | | |
|---|---|---|---|
| 3,667,862 | 6/1972 | Parr | 73/40 X |
| 3,691,820 | 9/1972 | Fiore | 73/40.7 |
| 3,972,223 | 8/1976 | Torghele | 116/70 X |
| 3,985,318 | 10/1976 | Dominey et al. | 116/70 X |

Primary Examiner—Charles A. Ruehl
Attorney, Agent, or Firm—A. Joe Reinert

[57] ABSTRACT

Early detection of cracks in nonpermeable, structural members subject to stress is effected before the cracks traverse the member by forming a plurality of cavities in the member or adjacent thereto in which a plurality of fluids at differing pressures are confined and monitored, such that a crack in the structural member penetrating between at least two cavities allows passage of fluid between the cavities and is thus detected by a pressure sensor. The apparatus and process is particularly applicable to early detection with vacuum of cracks in the heat affected zone adjacent to welds on critical stressed members of an offshore platform. A strain gauge system may be employed in conjunction with the crack detection system.

44 Claims, 10 Drawing Figures

EARLY CRACK DETECTION WITH MULTI-PRESSURE SYSTEM

RELATED APPLICATION

This application is related to application Ser. No. 778,660 filed Mar. 17. 1977 entitled "Early Crack Detection".

BACKGROUND OF THE INVENTION

The invention relates to early detection of the formation of cracks in non-permeable, structural members subject to stress.

In an important application, the invention relates to early detection of cracks in critical stressed members of an offshore platform employed to drill for or produce oil or gas.

BRIEF DESCRIPTION OF THE PRIOR ART

Formation of cracks in solid structural members subject to stress is a problem of great importance. In one example, offshore production and drilling platforms are an important aspect of fulfilling the energy needs of the nation and the world. Such platforms are being fabricated to drill and produce in deeper and deeper waters. To illustrate, structures are now being planned or constructed for waters of 900 feet or more in depth. Though such platforms remain in many instances the most practical way of recovering hydrocarbons from such depths, such great depths and turbulant environmental conditions combine to push the technology of platform construction to approach the state of the art of the metallurgy and designs involved.

Many other examples are evident of solid structural members subject to stress being critical to operation, safety, and the like. For example, weld joints joining hull plates on tankers and the like are critical. For example, if a member holding a helicopter blade, certain aircraft members, a highly stressed crane, power shovel, or dragline member, a bridge member, a reactor member, a pressure vessel, or the like fails due to stress cracking, the results can be catastrophic loss of human life and equipment as well as loss of productivity.

One possible failure site of great importance is the heat affected zone adjacent to a weld joining a structural member of an offshore platform to another member of the platform, particularly when the joint and member are critical to the integrity of the structure and subject to stress. If such structural members were to fail, the entire platform might be in danger with possible loss of life, environmental damage, and hundreds of millions of dollars loss of investment and lost production.

Therefore, it is extremely important that any cracks forming in such structural members be detected at the earliest possible stage so that appropriate repairs can be made, or if immediate repairs are impossible due to a storm, that personnel can be evacuated and operations shut in.

Various attempts have been made to detect such cracks. For example, visual inspection has been employed. Such visual inspection can be greatly enhanced by applying a material to the member, removing the material from the surface, and then applying a second material which reacts with the first to form a dye so that the first material oozing from a crack causes the crack to stand out to visual inspection. This method is commonly known as the dye-check method. However, this method is often not practical. Particularly, in the case of weld joints which are under water, it is not feasible for obvious reasons.

Accoustic emission methods have also been employed. However, a major disadvantage of such methods is that the equipment is relatively complex, and it is also difficult, if not impossible, using such equipment to determine the extent or site of the crack, or to determine small cracks in critical members at an early stage.

A third method which has been employed is the magnetic particle orientation method which is useful with ferrous metals. However, this method is also not practical for application to underwater joints and in a number of other situations.

Ultra-sonic tests have also been employed. However, these methods are generally geometry dependent. Such methods are also highly surface condition dependent, that is, the surface must be relatively smooth in order to use such ultra-sonic methods.

U.S. Pat. No. 3,667,862 discloses detecting a crack in a wall of a hollow object, exemplarily a blade spar of a rotor blade for a helicopter, by pulling a vacuum on the inside of the hollow body and sensing loss of vacuum. However, this method is not suitable for detection of cracks in non-permeable, solid structural members. It also fails to detect a crack until the crack has completely penetrated the hollow body which is sensed.

Other methods of detecting cracks are known but lack suitability for early detection of cracks or are not otherwise suitable for application to the problem outlined above.

In another art, U.S. Pat. Nos. 3,949,596; 2,660,053; 1,371,484; 3,524,342; 4,002,055, and 3,043,129 are exemplary of references showing detection of leaks in vessels by forming a sealed cavity over a possible leak site such as a joint of the like and then pulling a vacuum on the cavity to detect a leak by loss of vacuum, by soap bubbles, or by a tracer gas placed within the vessel. Such methods are not suitable for solution of the problems outlined heretofore for a variety of reasons. Principally, such methods relate to detection of leaks in closed vessels not to detection of formation of cracks in structural members. They also relate to detection of pre-existing leaks, not to detection of cracks formed by environment conditions during a monitoring period.

The invention disclosed in application Ser. No. 778,660, entitled Early Crack Detection, Filed Mar. 17, 1977 constitutes a substantial advance in the art by providing for early detection of cracks in non-permeable, solid structural members subject to stress at an early enough stage that corrective action can be taken. In doing so, it goes a long way toward solving a major problem in the art of offshore hydrocarbon production and in a number of other enterprises.

The present application constitutes an improvement on the process and apparatus disclosed in application Ser. No. 778,660 for certain applications. Thus, for example, when it is desired to completely coat the structural member with an impermeable sealant, it is not possible for environmental fluids to penetrate to the cavity or for pressured fluids to pass to the environment and to provide a means for detection of cracks. Also, in certain circumstances, the patches and cavities of the earlier application can be inadvertantly sealed from the environment by greases, coating, marine growth, and the like. The present invention provides an improvement which is of substantial value under a number of conditions found in field operations.

OBJECTS OF THE INVENTION

An object of the invention is to provide a process for early detection of cracks in non-permeable, structural members subject to stress before the cracks traverse the member.

Another object of the invention is to provide an apparatus for early detection of cracks in a non-permeable, structural member subject to stress before the cracks traverse the member.

SUMMARY OF THE INVENTION

A process and apparatus are provided for the early detecting of the formation of a crack in a nonpermeable, structural member subject to stress before the crack traverses the member, wherein the process comprises:
  (a) forming a first cavity in the structural member or adjacent thereto,
  (b) sealing a first fluid passageway in fluid communication from the first cavity to a first pressure source and to a pressure sensor,
  (c) establishing a fluid pressure (which can be a substantial vacuum) in the first cavity and first fluid passageway,
  (d) forming a second cavity in the structural member or adjacent thereto, adjacent to the first cavity but not in fluid communication therewith,
  (e) sealing a second fluid passageway in fluid communication from the second cavity to a second pressure source,
  (f) establishing a fluid pressure in the second fluid passageway and second cavity which differs from the pressure established in the first fluid passageway and first cavity, and
  (g) monitoring the pressure in the first cavity and first fluid passageway with the pressure sensor, such that a crack in the structural member penetrating between the first cavity and the second cavity allows passage of fluid between the cavities and is thus detected by the pressure sensor.

Thus, in one aspect, the second cavity and fluid passageway is pressurized with a fluid and fluid transfer from the second cavity to the first cavity is employed to detect a crack by a change in the vaccum in the first cavity and first fluid passageway. Thus, in another aspect, early detection of a crack at a critical site on an offshore platform is effected.

DESCRIPTION OF THE DRAWINGS

Figure 1:
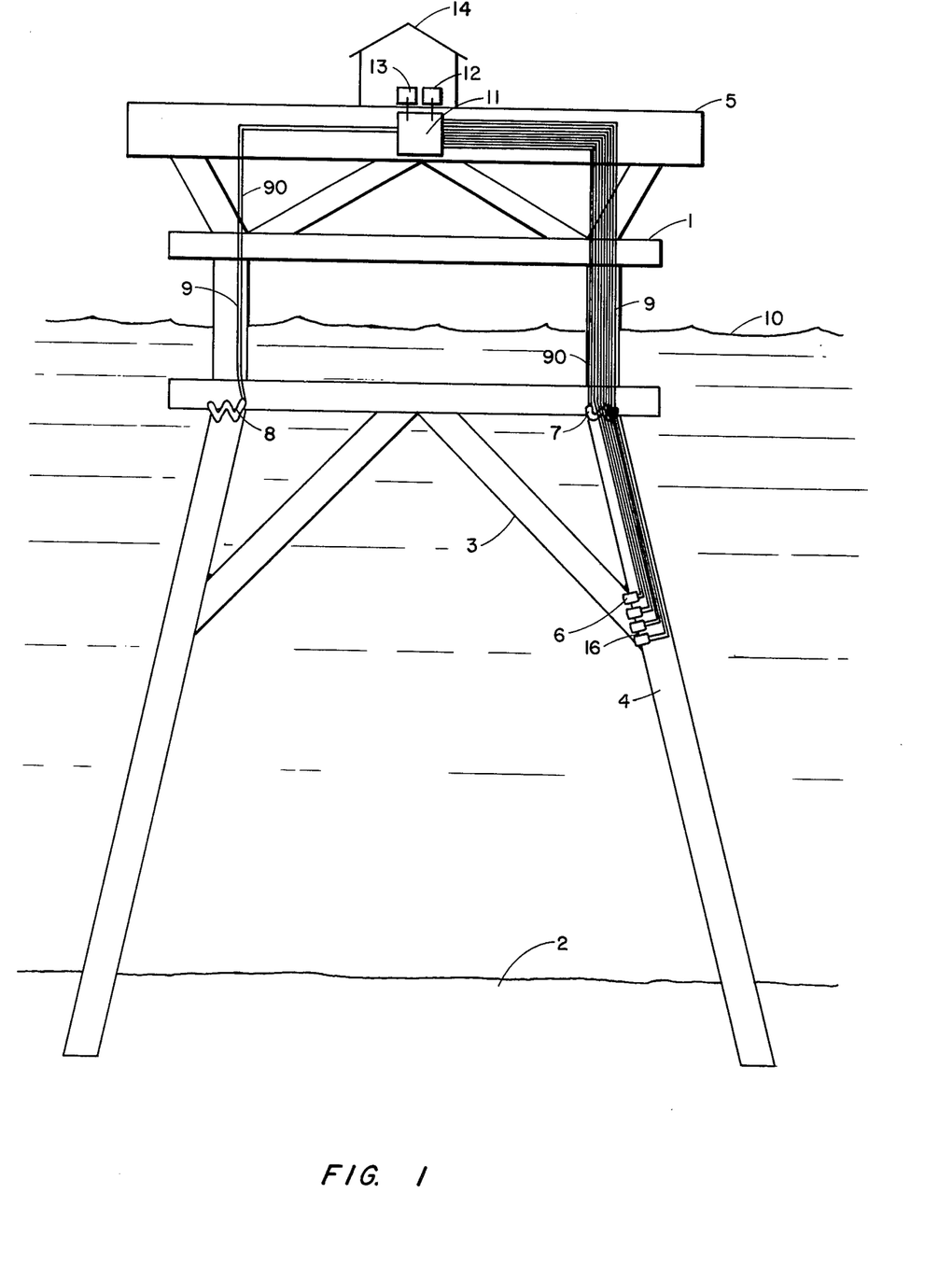
FIG. 1 is a schematic cross section of an offshore platform having an example of the apparatus of the invention aboard for monitoring stressed members.

FIG. 1 illustrates a cross section of an offshore platform having the apparatus of this invention implaced thereon.

The platform 1 rests upon and is affixed to sea floor 2 with its major portion submerged below the water level 10. It is comprised of various members including deck member 5, bracing member 3, and leg member 4. The members are joined together to form the platform by welds 16 as in the joint between member 3 and member 4. Patches 6 of the invention are connected by vacuum lines 9 to a central manifold and controller 11 and are also in fluid communication with vacuum source 12. Pressure lines 90 also connect pressure cavities within the patches with the atmosphere as a pressure source at central manifold and controller 11. Exemplary serpentine configuration patch 7 and zig-zag configuration patch 8 are also employed to monitor the heat affected zone adjacent to weld joints joining other critical members which are stressed by wind, wave, and current action, and the like. Vacuum manifold and controller 11 is connected to read-out 13 which combination has the capability of sequentially monitoring the patches and providing an alarm of leakage between the cavities of any patch by loss of vacuum in the line associated therewith. These components are sheltered by shelter 14 on the platform.

Figure 2:
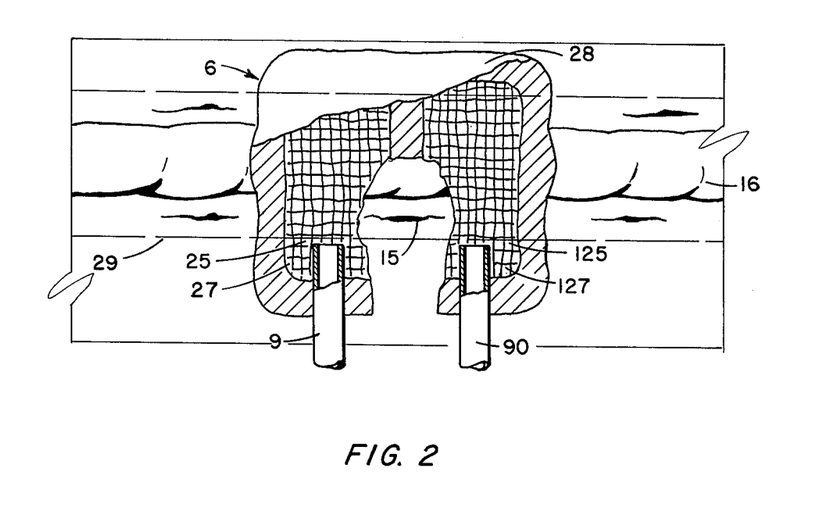
FIG. 2 illustrates a top sectional view of a patch embodiment of the invention situated on a weld and heat affected zone joining one structural member to a second structural member.

FIG. 2 illustrates a cut-away top sectional view of a patch embodiment of the invention. The vacuum line 9 is in fluid communication with a portion of the heat affected zone 29 adjacent to weld 16 subject to cracks 15 by way of cavity 25 filled with permeable material 27 within patch 6 sealed from the environment and from cavity 125 by impermeable sealant 28. Cavity 125 has fluid communication through permeable material 127 to line 90 which is connected to a pressure source (not shown). A crack 15 forming in the heat affected zone between cavity 25 and cavity 125 allows passage of fluid from cavity 125 to cavity 25 wherein the formation of the crack is detected by loss of vacuum via line 9.

Figure 3:
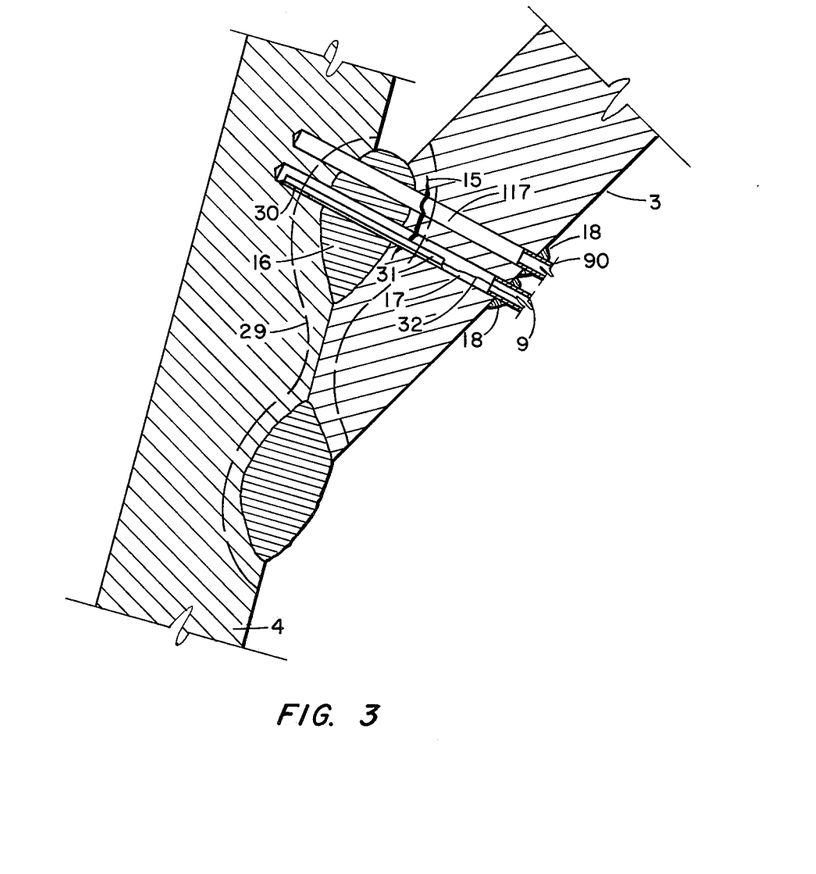
FIG. 3 shows a cross sectional view of an embodiment wherein a cavity is formed into the heat affected zone near a weld joint on the platform. It further shows the embodiment wherein a strain gauge is mounted in a cavity.

FIG. 3 illustrates another embodiment by a cross sectional view. Vacuum line 9 is sealed by sealant 18 to a cavity 17 drilled through the weld 16 and heat affected zone 29 joining member 3 to member 4. A strain gauge 31 is adhered to the side of the cavity 17 by adhesive 30 and connected to a read-out (not shown) by an insulated conductor 32 situated within vacuum line 9. A second cavity 117 drilled through the weld 16 and heat affected zone 29 joining member 3 to member 4, but not in fluid communication with the first cavity 17, is sealed by sealant 18 to a pressure source (not shown) by pressure line 90. A crack 15 penetrating from cavity 117 to cavity 17 allows passage of fluid from pressurized cavity 117 to vacuum cavity 17 and is detected by a loss of vacuum in cavity 17 as detected via vacuum line 9. An alarm is triggered.

Figure 4:
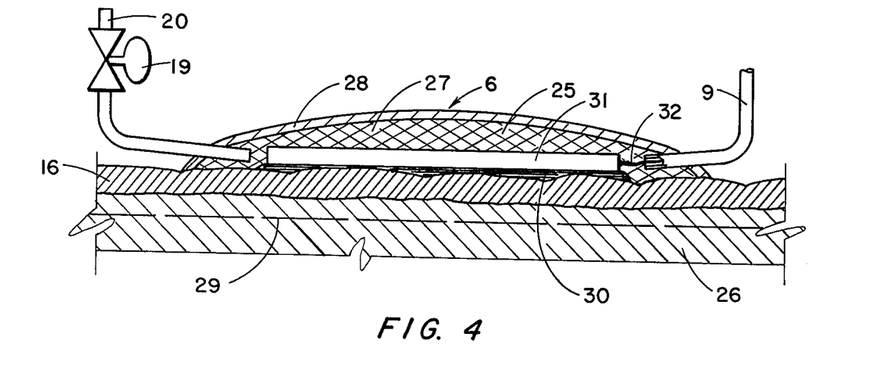
FIG. 4 shows a cross sectional view of an embodiment taken through the first cavity wherein provision is made to flush fluids through a patch embodiment of the invention and wherein a strain gauge is mounted in the patch in the first cavity.

FIG. 4 illustrates yet another embodiment by a vertical cross sectional view taken across a cavity 25. A strain gauge 31 is adhered to within the vicinity of weld 16 by means of adhesive 30. It is connected to a read-out (not shown) by an insulated conductor 32 situated within vacuum line 9 which pulls a vacuum on patch 6 comprising permeable material 27 forming a continuous fluid permeable cavity 25 sealed from another cavity 125 (not shown) by the impermeable sealant 28. The cavity 25 is sealed by sealant 28 on the opposite end to flushing tube 20 and valve 19 by which cavity 25 containing permeable material 27 and the system can be flushed. A similar arrangement can be readily visualized by second cross section taken through a pressurized cavity 125 shown by the view in FIG. 2.

Figure 5:
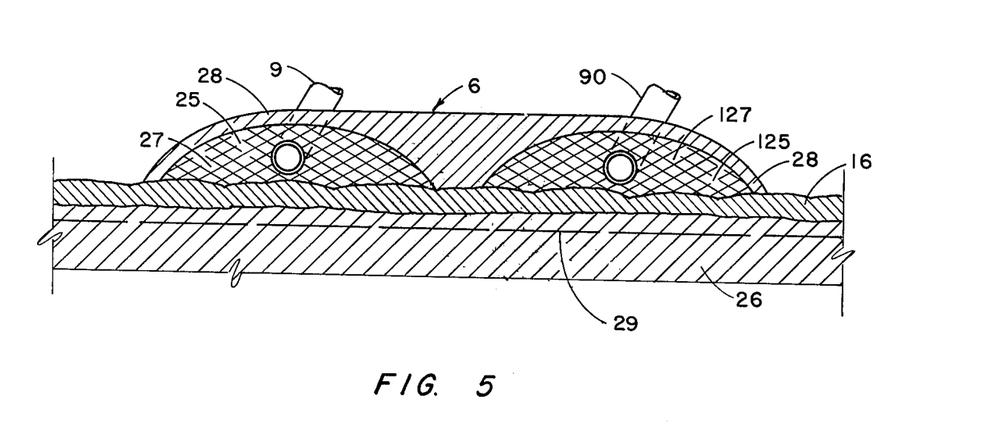
FIG. 5 illustrates a cross sectional view of an embodiment of the invention wherein a patch comprising a sealant overlying a permeable material monitoring a heat affected zone adjacent to a weld joint is employed.

FIG. 5 illustrates by another cross sectional view an embodiment wherein the vacuum line 9 is sealed to cavity 25 containing a permeable material 27 by a sealant 28 which also covers cavity 125 containing permeable material 127 in fluid communication with pressure line 90, the entirety forming patch 6 covering a portion of weld 16 and heat affected zone 29.

Figure 6:
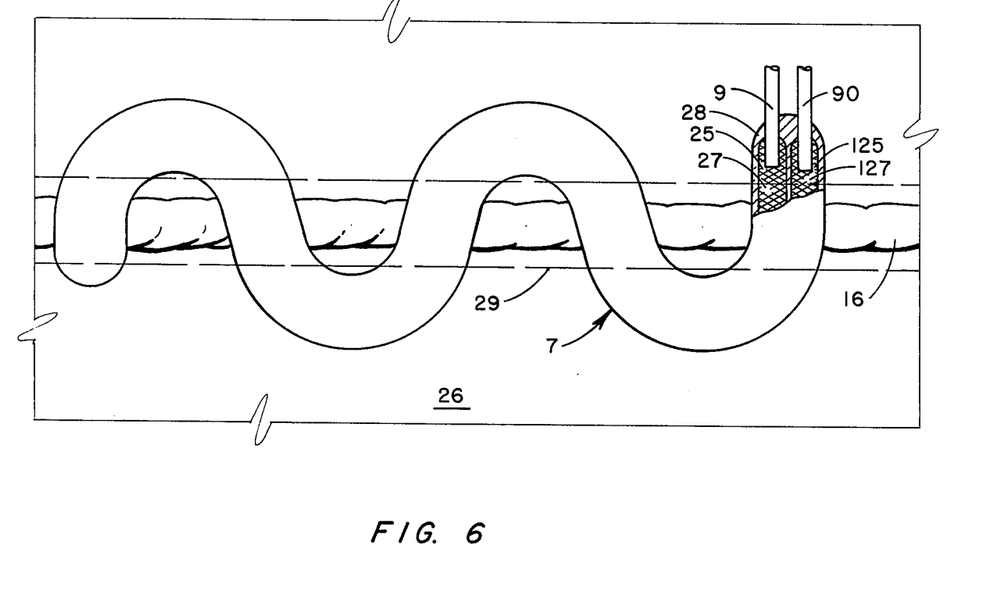
FIG. 6 illustrates a patch embodiment having a serpentine configuration monitoring a weld joint and the heat affected zone associated therewith.

FIG. 6 illustrates an embodiment wherein the patch 7 has a serpentine configuration wherein the vacuum line 9 is sealed to cavity 25 containing permeable material 27 by impermeable sealant 28, wherein pressure source line 90 is sealed to cavity 125 containing permeable material 127, the cavity being sealed from cavity 25 by impermeable sealant 28 and both cavities being sealed from the environment by sealant 28. The serpentine configuration patch criss-crosses weld 16 and heat affected zone 29 on substrate 26.

Figure 7:
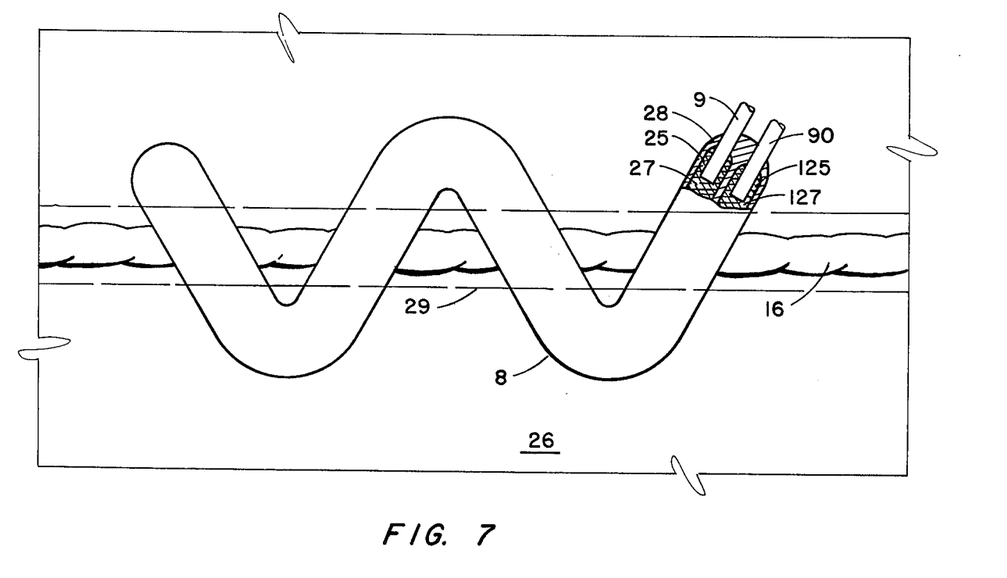
FIG. 7 illustrates a zig-zag configuration of a patch embodiment wherein a weld joint and heat affected zone are monitored for cracks.

FIG. 7 illustrates another embodiment wherein patch 8 has a zig-zag configuration. Vacuum line 9 is sealed to cavity 25 containing permeable material 27 and is sealed from the environment and from cavity 125 containing permeable material 127 by impermeable sealant 28. Cavity 125 is connected to a pressure source (not shown) by pressure line 90. The patch having a zig-zag configuration covers weld 16 and heat affected zone 29 on substrate 26.

Figure 8:
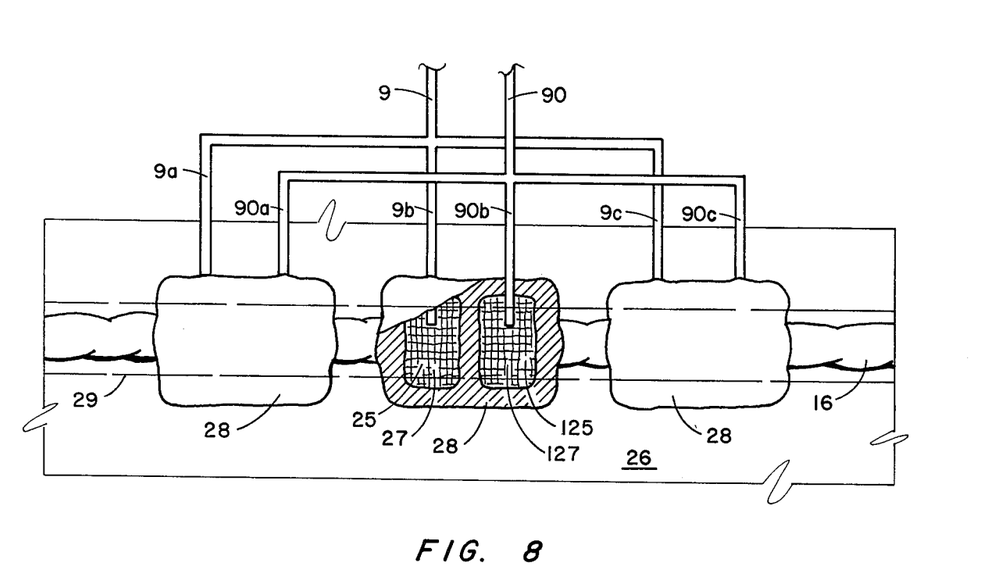
FIG. 8 illustrates an embodiment wherein a series of patches are employed to monitor a weld joint and the heat affected zone with vacuum lines and pressure lines manifolded.

FIG. 8 illustrates by a top view cut-away section another embodiment wherein a plurality of patches are employed to monitor weld 16 and heat affected zone 29 on substrate 26. Patches comprising permeable material 27 in cavities 25 situated over the heat affected zone and weld 16 are sealed from second cavities within the patch and from the environment by impermeable sealant 28 and are joined through a manifold in line 9A, 9B and 9C and thence through vacuum line 9 to the system. Pressure cavities are sealed from the vacuum cavities and from the environment by the impermeable sealant 28 and are joined through a manifold and lines 90A, 90B, and 90C and thence through pressure line 90 to a pressure source.

Figure 9:
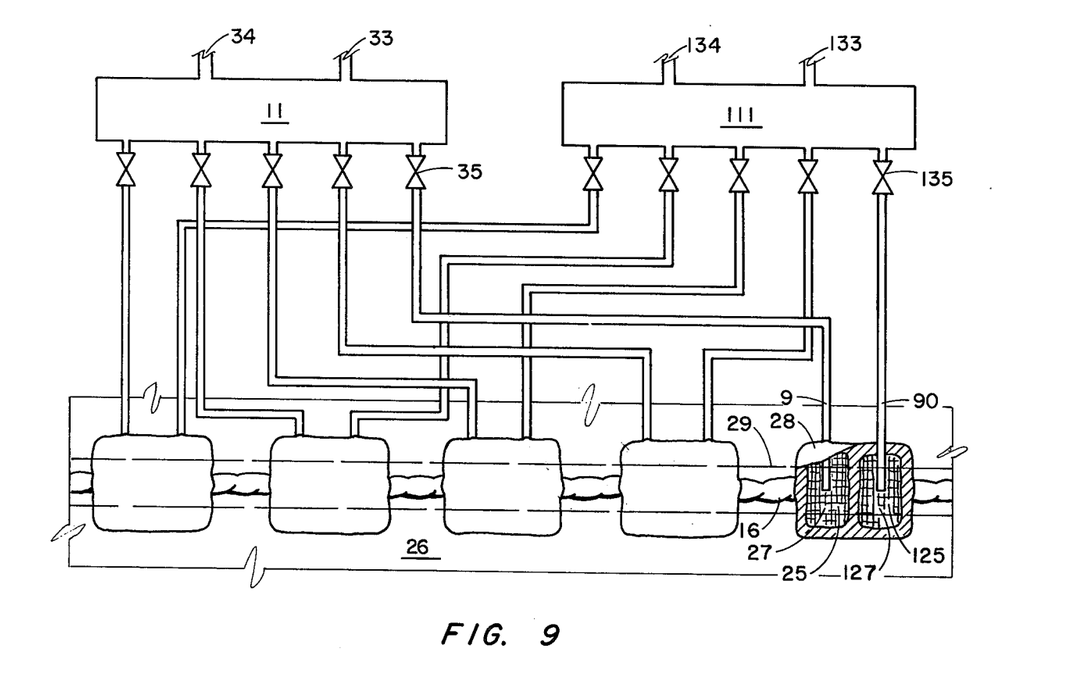
FIG. 9 is a schematic illustration of an embodiment wherein a series of patches are monitored.

FIG. 9 schematically illustrates yet another embodiment wherein patches over a substrate having the same numbering system and configuration as shown in the previous figures are joined by vacuum lines 9 to manifold 11. Line 34 connects to a vacuum source and valves 35 are sequentially switched and the pressure in each of the lines 9 is determined to pinpoint on a read-out with alarm which of the patches is indicating loss of vacuum and consequently the probability of early crack formation. Each patch also contains a second cavity 125 containing a permeable material 127 sealed from the vacuum cavity by the sealant 28 and connected via a pressure line 90 to a pressure source.

Figure 10:
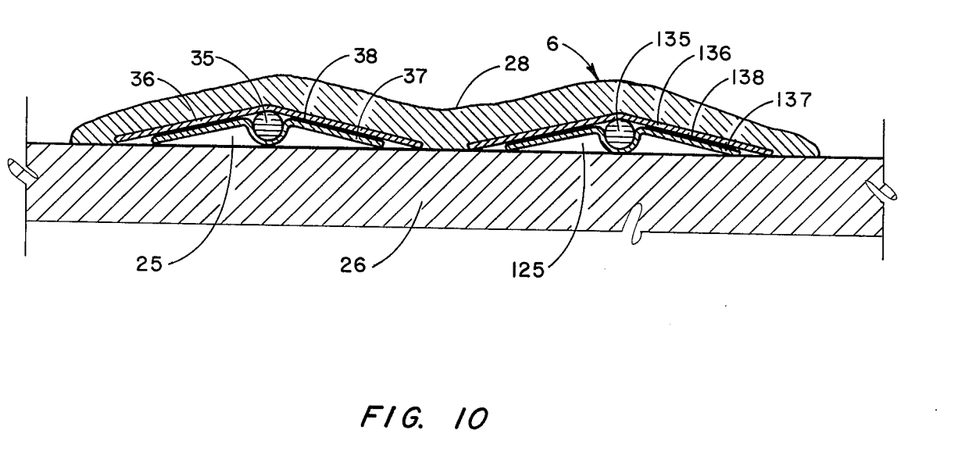
FIG. 10 is a cross section view of another patch embodiment of the invention wherein a wire member extends from the pressure line and props up a foil sheet to provide the cavities.

FIG. 10 shows a cross section of a patch 6 embodiment of the invention at a point wherein a wire member extends from each line to a locus away from the line. Thus, wire member 35 props up an upper foil sheet 36 which passes over the wire member and is held in association therewith by lower foil sheet 37 which is adhered to upper foil sheet 36 with an adhesive 38 at the interface therebetween. The foil sheets are sealed from the environment and from cavity 125 by sealant 28 to form cavity 25 for fluid communication to vacuum line 9 (not shown). Beside cavity 25 is a second cavity formed by wire member 125 propping foil sheet 136 which passes over the wire member 125 and is held in association therewith by lower foil sheet 137 which is adhered to upper foil sheet 136 with an adhesive 138 at the interface therebetween. The cavity 125 is provided with fluid communication to a pressure source by pressure line 90 (not shown).

PREFERRED EMBODIMENTS OF THE INVENTION

According to my invention, a first cavity is provided in a structural member or adjacent thereto. A second cavity is formed adjacent to the first cavity such that a crack forming in the structural member provides a passage for a fluid to flow between the first cavity and the second cavity without passing through the entire structural member. A fluid passageway is sealed in fluid communication from the first cavity to a pressure source which is at a higher or a lower pressure than a pressure source sealed in fluid communication to the second cavity. The fluid communication passageway to the first cavity is also sealed in fluid communication to a pressure sensor. The pressure in the first cavity and fluid passageway associated therewith is monitored with the pressure sensor so that a crack in the structural member penetrating between the cavities allows passage of fluid between the second cavity and the first cavity and is thus detected by the pressure sensor.

In a preferred embodiment, the pressure imparted to the first cavity is a very low pressure or a vacuum. The vacuum employed can be in the millitorr range for most applications. Devices to measure these low pressures (vacuum) are very sensitive, reliable, and relatively inexpensive.

It is also possible that a crack will penetrate from the environment to the first cavity when the first cavity has a pressure less than ambient pressure. If the crack detector is located under water, the fluid which will lower the vacuum which penetrates from the environment will be water vapor. Thus, the triple point of water is 0.0076° C at 0.46 torr. Therefore, all water above freezing and below 0.46 torr will be subject to the gas laws: $P_1V_1/T_1 = P_2V_2/T_2$.

Thus, one mole of water as a gas (18 grams) will fill a volume of 22.4 liters at 273° K and 760 torr. Dropping the pressure to convert the water to a gas will give 18 grams equal 22.4 × 10$^4$ liters × 760 × 10$^{-4}$ torr. Therefore, a crack detection system of 22.4 liters volume maintained at 7.6 × 10$^{-4}$ torr which is an easily maintained vacuum would result in a water leak of 0.0018 grams (ml) (approximately 1/25th of a water drop from an eyedropper) leaking into the system raising the pressure by $7.6 \times 10^{-2}$ torr for a total pressure of 0.07676 torr. This constitutes a pressure increase of about 100 times and is readily detectable. Therefore, it is seen that even very minute leaks under the patch through a crack in the structural member into a cavity maintained under vacuum or into the cavity maintained under vacuum of water or of another fluid such as air result in considerable loss of vacuum and are readily detectable by the sensor devices available. In like manner, fluids passing from the second cavity which is pressurized with a fluid to the first cavity which has a pressure of less than the second cavity is readily detectable by the sensor device associated with the first cavity.

A crack propagating on a heat affected zone intersected with a patch will provide a leak path between the second cavity and the first cavity or between the exterior and the first cavity on the interior of the patch when the patch embodiment is employed. This leak is readily detected by the pressure sensor in fluid communication with the patch. Of course, a pressure sensor can also be employed in fluid communication with the second cavity to detect a loss of pressure therefrom via a crack in the structural member either to the first cavity or to the environment.

According to one presently preferred embodiment, the vacuum line from the first cavity in a patch, or from a series of patches manifolded together and monitoring a weld joint and heat affected zone associated therewith can have a vacuum pulled by a vacuum source. Thereupon, the line can be shunted by a suitable valve arrangement to a differential pressure transducer such as described in U.S. Pat. No. 3,505,634, or more preferably a thermocouple gauge. Thereupon, if vacuum is lost in the line between the transducer and the patch due to crack propagation, the transducer provides an electrical signal indicating the pressure difference. This can be rigged to trigger an alarm such as a light, bell, or the like. An indicating board having a series of alarm devices can be set up to monitor critical points on the entire platform. When a series of patches are placed across a critical weld and heat affected zone associated therewith, positive response of patches in a row in a progression indicates extreme probability that the joint is failing. The transducer or thermocouple gauge can also produce an electrical signal proportional to the differential in pressure, and a preset amount of the signal can be designed into the system so that an alarm will only triggered when this prearranged difference in pressure is reached. Alternatively, a sensor and ion pump can be provided for each patch. Alternatively, one or more differential pressure transducers or thermocouple gauges can be employed with sequential scanning of the various lines between the vacuum source and the patches through the transducer or thermocouple gauge by a series of valves and solenoids. In like manner, pressure on the pressure cavity can be readily monitored to detect a loss of pressure therefrom either to the environment or to the vacuum cavity.

According to another preferred embodiment the vacuum line from the vacuum cavity of each patch is run to a vacuum manifold which is evacuated with a conventional mechanical vacuum pump employing cold traps, absorbants and the like. High vacuum is obtained with an ion pump. A thermocouple gauge is positioned in each line between the patch and the manifold. Upon penetration of the vacuum cavity by a crack either from the environment or from the pressurized cavity, fluid enters and the differential pressure is detected by the thermocouple gauge which triggers an alarm and activates a solenoid activated valve situated in the vacuum line between the thermocouple gauge and the vacuum manifold. An advantage of this arrangement is that vacuum cavity in each patch is monitored and high vacuum is not lost in the system upon a single vacuum cavity losing vacuum. The time and trouble needed to isolate the open line and rebuild vacuum first with a conventional pump and then with the ion pump is thus avoided. Also the system is not contaminated with the fluid leaking in, and a hiatus in monitoring is avoided. This embodiment is of particular value when a large number of sites on an offshore platform are monitored. In like manner, the pressure cavities can be also monitored, or according to another embodiment, the pressure cavities can be simply opened by pressure lines to the atmosphere in a sheltered site.

The vacuum or higher pressure source employed can be any conventional device for producing vacuum or pressure. Thus, a conventional vacuum pump can be employed to reduce pressure to a low level. Suitable absorbants, cold traps, and the like can be employed. High vacuum can readily be provided with suitable ion pumps which are readily available.

In one embodiment for use upon an offshore platform, the pumping system is fabricated to handle up to 100 detectors and to produce a pressure drop of about 2.5 liters per second at $10^{-5}$ torr for the first day with steadily declining pressure for several days to about $10^{-7}$ torr. The vacuum system, of course, can be designed for the particular monitoring system employed, and this is well within the skill of engineers skilled in the art, or can be readily determined by simple experimentation. The vacuum and monitoring system can be fabricated largely of conventional off-the-shelf hardware. Considerable variety of such hardware is available from a number of sources, exemplarily, the Varian Company.

The sealant employed according to this invention can be any of a number of sealants. For example, solder, brazing material, expoxy-based sealants, silicone materials, butyl rubber sealants, hot melt formulations, and any of a variety of other materials can be employed if desired. According to a presently preferred mode, a material which has been found to be very satisfactory is KNEDATITE sealant available from Knedatite Division of Polymeric Systems, Inc., 860 Cross Street, Potstown, Pa. It is an epoxy/polyamide system which is supplied as a two-part, hand-mixable tape which is then kneaded together, and cures within a few hours. This expoxy-based sealant is easily formed into the covering for a patch within one hour after mixing and cures into a flexible, tough, hard, well-adhering material. It can be applied under water and has been found to make quite suitable bonds in its use as a sealant as described according to this invention. It has been satisfactorily tested on V-bend fatigue samples both in air and under water with complete success.

A patch fabricated with this epoxy-based material has been tested at pressure up to 500 psig in water and found to have good vacuum integrity without loss of imperviousness.

The permeable material 27 or bleeder materials which can be implaced in the cavities of this invention particularly in the embodiment wherein patches are employed, can be any material which will hold the cavity open to the flow of fluid when vacuum is applied. Suitable materials can include paper, cloth prepared of natural or synthetic fibers, open-cell foamed plastics, and the like. A fabric woven of Dacron fibers is quite suitable.

Alternatively the patch can have a wire member or the like extending from the end of the vacuum line which props up a foil sheet or similar cover to hold open a vacuum passage under the sealant of the patch. In like manner, a wire member or the like extending from the end of the pressure line can be employed to prop up a foil sheet or similar cover to hold open a pressure passage under the sealant of the patch while the sealant sets up.

According to a presently preferred mode of operation, when patches are employed, the porous material, or bleeder material is overlain with an impermeable barrier before the sealant is applied in fabricating the patches. The barrier material can be any of a number of substances which are impermeable to fluids. For example, thin metal foil, such as aluminum foil, polyester terephthalate plastic films, of which a commercially available example is trademarked MYLAR film, are quite suitable.

In an embodiment wherein a strain gauge is implaced within a cavity formed by the patch or in a cavity milled into the structural member, the strain gauge can be adhered by any suitable adhesive. Examples include commercially available epoxy resins, silicone-based adhesives, cyanoacrylate-based adhesives, and the like.

The strain gauge within the patch or cavity embodiment is very advantageous in that assurance is provided by vacuum integrity that the strain gauge sensor is protected from the environment and is not being affected by moisture and the like. Data obtained from the combination is valuable for correlation purposes.

Wherein a positive pressure is imparted in the pressurized cavity, any suitable fluid, preferrably air, or an inert gas can be employed to pressurize the positive pressure cavity and the pressure passageway and rest of system associated in fluid communication therewith. When positive pressure is applied to the system, care must be taken not to exceed the pressure containable by the sealants and lines employed.

Though the entire portion of the structural member to be monitored can be sealed from the environment with a sealant, according to one presently preferred embodiment, it is preferable at the portion of the structural member to be monitored not be entirely sealed from the environment with the sealant. According to this embodiment, cracks can propagate under the sealant from the environment as well as from the pressure cavity into the vacuum cavity, and detection capability is thereby enhanced. Coverage of less than 10% of the surface with the sealant member of the patch is often quite suitable.

The foregoing exemplification and description are provided to more fully explain the invention and provide information to those skilled in the art on how to carry it out. However, it is to be understood that such is not to function as limitation on the invention as described and claimed in the entirety of this application.

I claim:

1. A process for the early detection of the formation of a crack in a non-permeable, structural member subject to stress before the crack traverses the member, the process comprising:
   (a) forming a first cavity in the structural member or adjacent thereto,
   (b) sealing a first fluid passageway in fluid communication from the first cavity to a first pressure source and to a pressure sensor,
   (c) establishing a fluid pressure in the first cavity and first fluid passageway,
   (d) forming a second cavity in the structural member or adjacent thereto, adjacent to the first cavity but not in fluid communication therewith,
   (e) sealing a second fluid passageway in fluid communication from the second cavity to a second pressure source,
   (f) establishing a fluid pressure in the second fluid passageway and second cavity which differs from the pressure established in the first fluid passageway and first cavity,
   (g) monitoring the pressure in the first cavity and first fluid passageway with the pressure sensor,
such that a crack in the structural member penetrating between the first cavity and the second cavity allows passage of fluid between the cavities and is thus detected by the pressure sensor.

2. The process of claim 1 wherein the first cavity is formed into the heat affected zone adjacent to a weld joint on the structural member, and wherein a low pressure constituting a substantial vacuum is established in the first cavity and first fluid passageway.

3. The process of claim 2 wherein a plurality of cavities are formed in the heat affected zone.

4. The process of claim 2 wherein the structural member is a part of an offshore platform and wherein the heat afffected zone is adjacent to a weld joint joining the member to another member of the offshore platform.

5. The process of claim 4 wherein the passageway is a metal tube, wherein the first cavity is a drill bore having a volume less than 1 percent of the heat affected zone, wherein the drill bore traverses a substantial portion of the heat affected zone and has a length at least ten times its diameter, wherein an epoxy-resin based sealant is employed to seal the first fluid passageway to the first cavity and to the first pressure source and to seal the second fluid passageway to the second cavity and to the second pressure source, wherein the heat affected zone sensed is below the surface of the water, and wherein the sensor is above the surface of the water.

6. The process of claim 4 wherein the sensor is rigged to trigger an alarm upon loss of vacuum in the first cavity and first fluid passageway.

7. The process of claim 5 wherein a plurality of cavities are formed in a heat affected zone near a weld joint on a critical stressed member.

8. The process of claim 7 wherein a plurality of structural members are monitored with a common vacuum passageway and wherein an alarm is triggered by the sensor upon a predetermined loss of vacuum.

9. The process of claim 1 wherein both fluid passageways comprise tubular members and wherein both cavities are formed adjacent to the structural member by adhering the tubular members to the structural member with a sealant.

10. The process of claim 1 wherein both fluid passageways comprise tubular members, wherein the pressure established in the first cavity and fluid passageway is a low pressure constituting a substantial vacuum, wherein the cavities are formed adjacent to the structural member by forming a patch by placing the tubular members adjacent to the structural member each in fluid communication with a permeable material also placed adjacent to the structural member, and sealing both from the environment and from each other with an impermeable sealant.

11. The process of claim 10 wherein each tubular member is overlain by its respective permeable material, each permeable material is overlain by an impermeable barrier, and both are sealed from each other and from the environment by the impermeable sealant.

12. The process of claim 10 wherein each tubular member is overlain by its respective permeable material, each tubular member is overlain by an impermeable barrier, and both are sealed from the environment and from each other by the impermeable sealant.

13. The process of claim 10 wherein the structural member is part of an offshore platform and is secured to other structural members by weld joints, wherein the patch is placed across the heat affected zone adjacent to a weld joint joining the member to another member of an offshore platform.

14. The process of claim 13 wherein the patch covers no more than 50% of the heat affected zone, wherein the sealant is an epoxy resin based sealant, wherein the heat affected zone sensed is below the surface of the water, and wherein the sensor is above the surface of the water.

15. The process of claim 14 wherein the sensor is rigged to trigger an alarm upon loss of vacuum in the first cavity and first fluid passageway.

16. The process of claim 15 wherein a plurality of patches are placed in contact with a heat affected zone near a weld joint on a critical stressed member.

17. The process of claim 16 wherein a plurality of structural members are monitored with a common vacuum passageway and wherein an alarm is triggered by the sensor upon a predetermined loss of vacuum.

18. The process of claim 17 wherein each tubular member in the patch is underlain by a permeable material and overlain by an impermeable barrier, and both are sealed from the environment and from each other by the impermeable sealant.

19. The process of claim 18 wherein the structural member is a part of an offshore platform, wherein the patch is placed in contact with the heat affected zone adjacent to a weld joint on a structural member, wherein the heat affected zone is adjacent to a weld joint joining the member to another member of the offshore platform, wherein each passageway is a metal tube, wherein the heat affected zone sensed is below the surface of the water, wherein the vacuum sensor is above the surface of the water, and wherein the insulated electrical conductor is passed through one of the metal tubes for at least a distance to above the surface of the water.

20. The process of claim 10 wherein strain on the structural member is monitored by adhering a strain gauge sensor to the structural member within the patch and passing an insulated electrical conductor therefrom to a read-out.

21. The process of claim 1 wherein the pressure in the second cavity and the second fluid passageway is monitored with a second pressure sensor.

22. The process of claim 1 wherein the first cavity is formed into the heat affected zone adjacent to a weld joint on the structural member, and wherein a very low pressure constituting a substantial vaccum is established in the first cavity in the first fluid passageway.

23. The process of claim 1 wherein both fluid passageways comprise tubular members, wherein the pressure established in the first cavity and fluid passageway is a very low pressure constituting a substantial vacuum, wherein the cavities are formed adjacent to the structural member by forming a patch by placing the tubular members adjacent to the structural member each in fluid communication with a permeable material also placed adjacent to the structural member, and sealing both from the environment and from each other with an impermeable sealant.

24. The process of claim 1 wherein both fluid passageways comprise tubular members, wherein the pressure established in the first cavity and fluid passageway is a low pressure constituting a substantial vacuum, wherein the cavities are formed adjacent to the structural member by forming a patch by placing the tubular members adjacent to the structural member each in fluid communication with a propped cavity formed by placing a propping member adjacent to the structural member, placing a sheet of impermeable material over the propping member, and sealing the thus formed cavities from each other and from the environment with an impermeable sealant.

25. An apparatus for the early detection of a crack in a non-permeable, structural member subject to stress before the crack traverses the member, the apparatus comprising:
(a) a first cavity formed into the structural member or adjacent thereto,
(b) a first fluid passageway sealed in fluid communication from the first cavity to a first pressure source and to a pressure sensor, having a fluid pressure in the first cavity and first fluid passageway,
(c) a second cavity in the structural member or adjacent thereto, adjacent to the first cavity but not in fluid communication therewith,
(d) a second fluid passageway sealed in fluid communication from the second cavity to a second pressure source, having a second fluid pressure in the second fluid passageway and second cavity which differs from the first fluid pressure in the first fluid passageway and first cavity.

26. The apparatus of claim 25 wherein the first cavity is formed from the surface into the structural member.

27. The apparatus of claim 25 wherein the first cavity is formed from the surface into the structural member, wherein a strain gauge sensor is adhered to the structural member within the first cavity, and wherein an insulated conductor passes from the strain gauge sensor to a read-out device therefore.

28. The apparatus of claim 27 wherein the first cavity is milled into the heat affected zone adjacent to a weld joint on a structural member, wherein the source of pressure in (b) is a vacuum source, wherein the structural member is a part of an offshore platform, wherein the heat affected zone is adjacent to a weld joint joining the member to another member of the offshore platform, wherein the first passageway is a metal tube, wherein the cavity is a drill bore having a volume of less than 1 percent of the heat affected zone, wherein the drill bore traverses a substantial portion of the heat affected zone, wherein an epoxy resin-based sealant is employed to seal the first fluid passageway to the first cavity and to the first pressure source and to seal the second fluid passageway to the second cavity and second pressure source, wherein the heat affected zone sensed is below the surface of the water, wherein the pressure sensor is above the surface of the water, wherein the conductor from the strain gauge sensor to the readout is passed through the vaccuum passageway to at least above the surface of the water.

29. The apparatus of claim 28 wherein the sensor is rigged to trigger an alarm upon loss of vacuum in the system, wherein a plurality of structural members are monitored with a common vacuum passageway, and wherein an alarm is rigged to be triggered by the pressure sensor upon a predetermined loss of vacuum.

30. The apparatus of claim 25 wherein: the first cavity and the second cavity are formed adjacent to the structural member.

31. The apparatus of claim 30 wherein the fluid pressure in the first fluid passageway is a substantial vacuum, wherein one end of each fluid passageway is adjacent to a permeable material which is adjacent to the structural member and in fluid communication with the fluid passageway, and wherein the permeable material is overlain by an impermeable barrier and sealed from the environment and from the second cavity and fluid passageway by an impermeable sealant.

32. The apparatus of claim 31 wherein the sealant covers no more than 10% of the surface of the structural member to be sensed.

33. An apparatus for the early detection of the formation of a crack in a non-permeable, structural member subject to stress before the crack traverses the member, the apparatus comprising:
(a) a first vacuum source,
(b) a first vacuum sensor,
(c) a vacuum tight line connecting the first vacuum source and the vacuum sensor,
(d) a patch sealed in vacuum tight relationship to the line, the patch comprising a first permeable cavity adjacent to the end of the first vacuum line and to the structural member, the patch further comprising a second cavity adjacent to the structural member but sealed from the first cavity, the second cavity sealed to a line providing fluid communication with a second pressure source.

34. The apparatus of claim 33 wherein the patch is placed across the heat affected zone adjacent to a weld joint on the structural member.

35. The apparatus of claim 34 wherin a plurality of patches are placed across the heat affected zone.

36. The apparatus of claim 35 wherein the structural member is a part of an offshore platform and wherein the heat affected zone is adjacent to a weld joint joining the member to another member of the offshore platform.

37. The apparatus of claim 36 wherein the patch is elongated and placed to cover in a zig-zag or serpentine fashion a substantial portion of the heat affected zone adjacent to a weld joint joining an underwater member of an offshore platform to another underwater member of an offshore platform.

38. The apparatus of Claim 33 wherein the vacuum sensor is rigged to trigger an alarm upon loss of vacuum in the system.

39. The apparatus of claim 33 wherein the sensor is rigged to trigger an alarm upon loss of vacuum in the system, wherein a plurality of patches are monitored with a common vacuum passageway, wherein an alarm is triggered by a sensor upon a predetermined loss of vacuum, wherein substantially all critical stressed weld joints on an offshore platform are monitored, wherein the patches comprise a cavity comprising a first layer of porous material, overlying the porous material, the end of the vacuum line; overlying the end of the vacuum line, a layer of metallic foil covering the end of the vacuum line and the porous material; overlying the foregoing, an overlyiing layer of a epoxy based sealant forming a fluid tight barrier adhering the porous material, the end of the vacuum line, and the foil material to the structural member and forming a fluid tight barrier between the first cavity and the second cavity.

40. The apparatus of claim 39 wherein the patch has a length at least two times its width.

41. The apparatus of claim 33 wherein a plurality of patches are positioned across the heat affected zone adjacent to a weld joint on the structural member, wherein the structural member is part of an offshore platform, and wherein the heat affected zone is adjacent to a weld joint joining the member to another member of the offshore platform, wherein the weld joint is under the surface of the water, wherein a common vacuum source and passageway are employed to pull vacuum on the plurality of first cavities in a plurality of patches, wherein a differential pressure sensor is positioned in fluid tight relationship in the vacuum line going to each patch, and wherein the differential pressure sensor in each vacuum line is rigged to trigger an alarm indicating crack penetration within the structural member between the first cavity and the second cavity to admit pressured fluid from the second cavity to the first cavity.

42. The apparatus of claim 33 wherein the cavities are formed within the patch by a propping member adjacent to the end of each line, and impermeable sheet material overlying the propping member so as to form a fluid channel extending therefrom, and a sheet and end of vacuum line for each cavity sealed from the environment and from the other cavity with a fluid impermeable sealant.

43. The apparatus of claim 42 wherein the patch is placed across the heat affected zone adjacent to a weld joint on the structural member.

44. The apparatus of claim 42 wherein a plurality of the patches of (d) of claim 33 are placed across the heat affected zone adjacent to a weld joint on the structural member, wherein the structural member is part of an offshore platform, wherein the heat affected zone is adjacent to a weld joint joining the member to another member of the offshore platform and is below the water line, wherein a differential pressure sensor is placed in each vacuum line between the vacuum source and each patch, and wherein each differential pressure sensor is rigged to trigger an alarm upon loss of vacuum in the first passageway effecting a differential pressure.

* * * * *